US011987251B2

(12) United States Patent
Shahriari et al.

(10) Patent No.: US 11,987,251 B2
(45) Date of Patent: May 21, 2024

(54) ADAPTIVE RATIONALIZER FOR VEHICLE PERCEPTION SYSTEMS TOWARD ROBUST AUTOMATED DRIVING CONTROL

(71) Applicant: GM Global Technology Operations LLC, Detroit, MI (US)

(72) Inventors: Mohammadali Shahriari, Markham (CA); Reza Zarringhalam, Whitby (CA); Haley Marie Dalzell, Ann Arbor, MI (US); Khizar Ahmad Qureshi, Pickering, MI (US); Patrick Francis Pirrmann, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 358 days.

(21) Appl. No.: 17/526,662

(22) Filed: Nov. 15, 2021

(65) Prior Publication Data

US 2023/0150514 A1 May 18, 2023

(51) Int. Cl.
*B60W 40/10* (2012.01)
*G01C 21/34* (2006.01)

(52) U.S. Cl.
CPC ......... *B60W 40/10* (2013.01); *G01C 21/3461* (2013.01); *B60W 2552/15* (2020.02); *B60W 2552/30* (2020.02); *B60W 2552/53* (2020.02)

(58) Field of Classification Search
CPC ............. B60W 40/10; B60W 2552/53; B60W 2552/30; B60W 2552/15; G01C 21/3461
See application file for complete search history.

(56) References Cited

U.S. PATENT DOCUMENTS

| | | | |
|---|---|---|---|
| 6,385,539 B1 | 5/2002 | Wilson et al. | |
| 6,405,132 B1 | 6/2002 | Breed et al. | |
| 10,845,820 B2 | 11/2020 | Wheeler | |
| 10,928,830 B1 | 2/2021 | Tran | |
| 11,543,263 B1 | 1/2023 | Bosse et al. | |
| 11,721,205 B2 | 8/2023 | Modica et al. | |
| 11,845,444 B2 * | 12/2023 | McGrory | B60W 40/13 |
| 11,851,085 B2 * | 12/2023 | Eldar | G08G 1/09623 |
| 2006/0078197 A1 | 4/2006 | Mitsumoto et al. | |
| 2013/0253767 A1 | 9/2013 | Lee et al. | |
| 2016/0304120 A1 | 10/2016 | Okada et al. | |
| 2017/0097237 A1 * | 4/2017 | Wang | G01C 21/206 |
| 2017/0177952 A1 | 6/2017 | Nakamura | |
| 2018/0099667 A1 | 4/2018 | Abe et al. | |
| 2018/0197021 A1 | 7/2018 | Lee | |
| 2018/0249290 A1 | 8/2018 | Ivanov et al. | |
| 2018/0286051 A1 | 10/2018 | Suzuki et al. | |
| 2019/0145784 A1 | 5/2019 | Ma et al. | |
| 2020/0096359 A1 | 3/2020 | Sakr et al. | |
| 2020/0132498 A1 | 4/2020 | Matsumaru | |
| 2020/0149896 A1 | 5/2020 | Bush et al. | |

(Continued)

*Primary Examiner* — Peter D Nolan
*Assistant Examiner* — Wae L Louie
(74) *Attorney, Agent, or Firm* — Vivacqua Crane, PLLC (57) ABSTRACT

A system includes a computing device. The computing device includes a processor and a memory, the memory including instructions such that the processor is configured to: transform vehicle dynamics data to corresponding roadway geometry data, calculate a rationalization value based on a difference between the roadway geometry data and map-based roadway geometry data, and determine whether to modify a vehicle state based on the rationalization value.

20 Claims, 4 Drawing Sheets

(56) References Cited

U.S. PATENT DOCUMENTS

| | | |
|---|---|---|
| 2020/0257297 A1 | 8/2020 | Jammoussi et al. |
| 2020/0279391 A1 | 9/2020 | Gross et al. |
| 2020/0285233 A1* | 9/2020 | Hafner ................ G05D 1/0061 |
| 2020/0293797 A1 | 9/2020 | Liu et al. |
| 2020/0309541 A1 | 10/2020 | Lavy et al. |
| 2020/0312146 A1 | 10/2020 | Tanaka et al. |
| 2020/0318976 A1 | 10/2020 | Bush et al. |
| 2020/0409372 A1 | 12/2020 | Yu et al. |
| 2021/0003403 A1 | 1/2021 | Wheeler et al. |
| 2021/0063200 A1 | 3/2021 | Kroepfl et al. |
| 2021/0080955 A1 | 3/2021 | Wilkinson et al. |
| 2021/0148711 A1* | 5/2021 | Sun ...................... B60W 40/06 |
| 2021/0149415 A1 | 5/2021 | Bush et al. |
| 2021/0397854 A1 | 12/2021 | Brizzi et al. |
| 2022/0017086 A1* | 1/2022 | Baric ...................... G06T 7/73 |
| 2022/0063654 A1* | 3/2022 | Beaurepaire ......... B60W 50/14 |
| 2022/0076037 A1* | 3/2022 | Hochman ......... B60W 60/0015 |
| 2022/0111859 A1* | 4/2022 | Lu ...................... G01C 21/3453 |
| 2022/0135039 A1* | 5/2022 | Jardine ......... B60W 30/18159 701/26 |
| 2022/0169280 A1 | 6/2022 | Brown et al. |
| 2022/0196426 A1* | 6/2022 | Xu ...................... G01C 21/3461 |
| 2022/0219720 A1* | 7/2022 | Hartnett ......... B60W 30/18154 |
| 2022/0252422 A1 | 8/2022 | Zhang |
| 2022/0284619 A1 | 9/2022 | Brizzi et al. |
| 2022/0314983 A1* | 10/2022 | Kassar ................ B60W 60/001 |
| 2022/0315047 A1 | 10/2022 | Probst et al. |
| 2022/0340172 A1* | 10/2022 | Pendleton ......... B60W 30/0956 |
| 2023/0050706 A1 | 2/2023 | LeVasseur et al. |
| 2023/0076599 A1 | 3/2023 | Hung et al. |
| 2023/0098314 A1* | 3/2023 | Bacchus ................ B60W 50/06 701/25 |
| 2023/0137541 A1 | 5/2023 | Nguyen et al. |
| 2023/0144209 A1 | 5/2023 | Cai et al. |
| 2023/0152120 A1 | 5/2023 | Ikeda et al. |
| 2023/0215196 A1 | 7/2023 | Sakashita |
| 2023/0280184 A1* | 9/2023 | Keski-Valkama ......... B60W 60/001 701/25 |
| 2023/0303113 A1* | 9/2023 | Teo ...................... G06N 20/00 |
| 2023/0365133 A1* | 11/2023 | Olsson ................ B60W 10/20 |
| 2023/0399014 A1* | 12/2023 | Mehdipour ............ B60W 40/04 |
| 2023/0406315 A1* | 12/2023 | Chreptyk ......... B60W 30/18159 |

\* cited by examiner

ADAPTIVE RATIONALIZER FOR VEHICLE PERCEPTION SYSTEMS TOWARD ROBUST AUTOMATED DRIVING CONTROL

INTRODUCTION

The technical field generally relates to perception systems, and more particularly relates to systems and methods for determining a rationalization value that represents a deviation in sensor data and corresponding map data.

Automotive vehicles increasingly incorporate advanced driver assistance systems (ADAS) designed to automate and/or enhance the driving process and to increase the overall safety of the vehicle during operation. For example, ADASs can include "horizon-based" driver assistance system that utilizes map data and external sensor data to predict the path that the vehicle is likely to take along as it travels along the roadway.

SUMMARY

A system includes a computing device. The computing device includes a processor and a memory, the memory including instructions such that the processor is configured to: transform vehicle dynamics data to corresponding roadway geometry data, calculate a rationalization value based on a difference between the roadway geometry data and map-based roadway geometry data, and determine whether to modify a vehicle state based on the rationalization value.

In other features, the processor is further configured to calculate a rate of change of the rationalization value.

In other features, the processor is further configured to determine whether to modify the vehicle state based on the rationalization value and the rate of change of the rationalization value.

In other features, the processor is further configured to flag map data corresponding to a roadway segment, wherein the vehicle dynamics data corresponds to the roadway segment.

In other features, the processor is further configured to calculate the rationalization value according to:

$$e_\rho = \rho_{map} - \rho_V,$$

$$e_\theta = \theta_{map} - \theta_V,$$

$$e_\varnothing = \varnothing_{map} - \varnothing_V,$$

where $e_\rho$ comprises a curvature estimation error, $e_\theta$ comprises a bank angle estimation error, $e_\varnothing$ represents a grade angle estimation error, $\rho_{map}$ comprises a map-based curvature estimation, $\theta_{map}$ comprises a map-based bank angle estimation, $\varnothing_{map}$ comprises a map-based grade angle estimation, $\rho_V$ comprises a vehicle curvature estimation, $\theta_V$ comprises a vehicle bank angle estimation, and $\varnothing_V$ comprises a vehicle grade angle estimation.

In other features, the processor is further configured to calculate the rationalization value according to $R = E^T Q E$, where $$E = \begin{bmatrix} e_\rho \\ e_\theta \\ e_\phi \end{bmatrix},$$

R is the rationalization value, $E^T$ is a transpose of E, and Q is adapted based on lane centering error tracking.

In other features, the processor is further configured to transition a vehicle state from an autonomous state to at least one of a semi-autonomous state or a non-autonomous state based on the rationalization value.

In other features, the processor is further configured to generate an alert based on the rationalization value.

In other features, the processor is further configured to at least one of generate an alert based on the rationalization value or reduce control authority in uncertain environments.

In other features, the processor is further configured to evaluate a localized lane likelihood based on the rationalization value with respect to identified lane line and correct for lane level localization.

In other features, the processor is further configured to adapt at least one of an autonomous or a semiautonomous feature availability or control based on an assessment of the rationalization error over a prediction horizon.

In other features, the processor is further configured to combine localization and perception data over a receding horizon with historical vehicle dynamics measurements to isolate a source of potential discrepancies for robust lane following controls.

A vehicle including a system is disclosed. The system includes a controller including a processor and a memory. The memory includes instructions such that the processor is configured to: transform vehicle dynamics data to corresponding roadway geometry data, calculate a rationalization value based on a difference between the roadway geometry data and map-based roadway geometry data, and determine whether to modify a vehicle state based on the rationalization value.

In other features, the processor is further configured to calculate a rate of change of the rationalization value.

In other features, the processor is further configured to determine whether to modify the vehicle state based on the rationalization value and the rate of change of the rationalization value.

In other features, the processor is further configured to flag map data corresponding to a roadway segment, wherein the vehicle dynamics data corresponds to the roadway segment.

In other features, the processor is further configured to calculate the rationalization value according to:

$$e_\rho = \rho_{map} - \rho_V,$$

$$e_\theta = \theta_{map} - \theta_V,$$

$$e_\varnothing = \varnothing_{map} - \varnothing_V,$$

where $e_\rho$ comprises a curvature estimation error, $e_\theta$ comprises a bank angle estimation error, $e_\varnothing$ represents a grade angle estimation error, $\rho_{map}$ comprises a map-based curvature estimation, $\theta_{map}$ comprises a map-based bank angle estimation, $\varnothing_{map}$ comprises a map-based grade angle estimation, $\rho_V$ comprises a vehicle curvature estimation, $\theta_V$ comprises a vehicle bank angle estimation, and $\varnothing_V$ comprises a vehicle grade angle estimation.

In other features, the processor is further configured to calculate the rationalization value according to $R = E^T Q E$, where $$E = \begin{bmatrix} e_\rho \\ e_\theta \\ e_\phi \end{bmatrix},$$

R is the rationalization value, $E^T$ is a transpose of E, and Q is adapted based on lane centering error tracking.

In other features, the processor is further configured to transition a vehicle state from an autonomous state to at least one of a semi-autonomous state or a non-autonomous state based on the rationalization value.

In other features, the processor is further configured to generate an alert based on the rationalization value.

BRIEF DESCRIPTION OF THE DRAWINGS

The exemplary implementations will hereinafter be described in conjunction with the following drawing figures, wherein like numerals denote like elements, and wherein.

DETAILED DESCRIPTION

Implementations of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that implementations of the present disclosure may be practiced in conjunction with any number of systems, and that the systems described herein is merely exemplary implementations of the present disclosure.

Autonomous and semi-autonomous vehicles are capable of sensing their environment and navigating based on the sensed environment. Such vehicles sense their environment using multiple types of sensing devices such as radar, lidar, image sensors, and the like.

The present disclosure is directed to systems and processes that combine localization and perception data over a receding horizon with historical vehicle dynamics data to determine potential discrepancies between the two data sources, such as map data, sensor data, and/or camera data.

Figure 1:
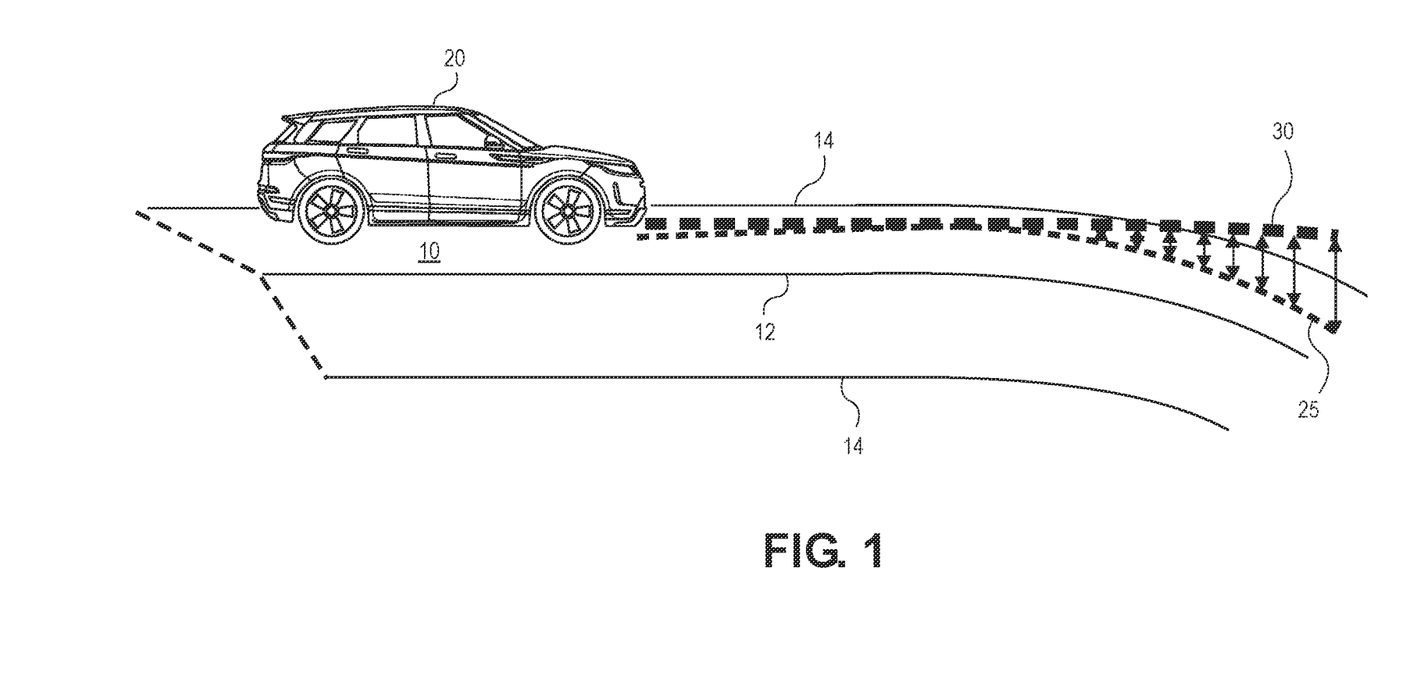
FIG. 1 depicts an example environment having a vehicle traversing a roadway in which sensor data representing roadway geometry captured by one or more vehicle systems differs with respect to corresponding map data representing the roadway geometry.

FIG. 1 illustrates an example environment that includes a vehicle 20 traversing a road surface 10. As shown, the road surface 10 includes a lane markings 12, 14. Lane marking 12 can be used to define the road surface 10 into at least two lanes, and lane markings 14 can be used to define the perimeter of the road surface 10. While depicted as a solid line, it is understood that the lane mark 12 can comprise intermittent markings.

The vehicle 20 can include driver-assistance systems (DAS) and/or advanced driver-assistance systems (ADAS) that use data provided by one or more sensors within the vehicle 20 to assist drivers with controlling the vehicle 20. DAS can include, but is not limited to, electronic stability control systems, anti-lock braking systems, and traction control systems. ADAS can include, but is not limited to, lane keeping assist (LKA) systems and adaptive cruise control (ACC) systems.

As the vehicle 20 travels the road surface 10, the vehicle's 20 road geometry sensing and estimation systems, i.e., vehicle dynamic states, mapping and/or localization, camera sensors, can be subject to errors and/or uncertainties. For example, as shown in FIG. 1, a predicted vehicle path trajectory 25 being traversed by the vehicle 20 and a predicted map vehicle path 30 may initially overlap. However, as a distance between the vehicle 20 and perceived objects increases, the predicted map vehicle path 30 and the predicted vehicle trajectory 25 may diverge as represented by increasing vertical lines.

Figure 2:
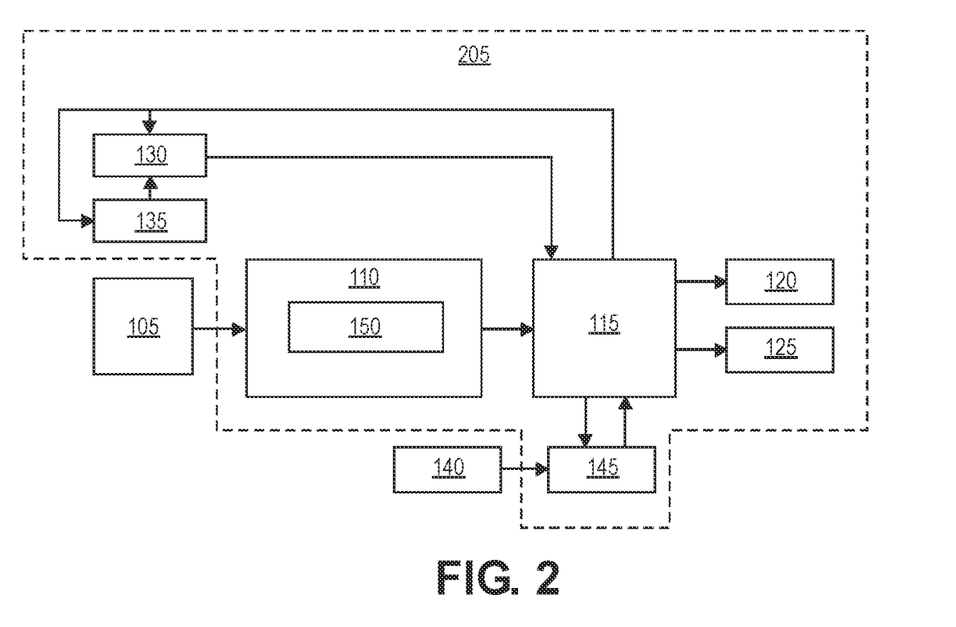
FIG. 2 depicts a system for calculating a rationalization value.

FIG. 2 illustrates an example control system 100 for operating a vehicle, such as the vehicle 20. The control system 100 includes one or more sensor devices 105, one or more cameras 140, and a computing device 205 that includes a vehicle state and path estimation module 110, an adaptive rationalizer module 115, an alert module 120, a vehicle control module 125, a localization module 130, a digital map database 135, and a fusion module 145.

The sensor devices 105 can include one or more of a radar device, LIDAR device, ultrasonic device, internal measurement unit (IMU), wheel encoders, electric power steering devices, a Global Positioning System (GPS) device or other similar device useful for gathering data about the vehicle, the environment of a vehicle and behavior of other vehicles upon a roadway. The cameras 140 can capture a series of images related to an environment proximate to and in the path of the vehicle, including but not limited to images of the road surface, images of lane markers, images of potential obstacles near the vehicle, images of vehicles around the vehicle, and other images of relevant information to controlling a vehicle.

The vehicle state and path estimation module 110 receives sensor data and/or camera data from the sensor devices 105 and/or the cameras 140. The vehicle state and path estimation module 110 can use suitable sensor fusion techniques and/or vehicle path determination techniques to determine vehicle dynamic states of the vehicle 20, i.e., position, heading, steering angle, as well as a vehicle path to traverse. The vehicle state and path estimation module 110 can also include a road geometry approximation module 150 that generates road geometry approximation data based on the vehicle dynamics data, which is described in greater detail below.

The adaptive rationalizer module 115 can receive vehicle localization data from the localization module 130 and road geometry approximation data from the road geometry approximation module 150. The adaptive rationalizer module 115 generates a rationalization value over a prediction horizon the vehicle 20. The rationalization value can be defined as a discrepancy between map data provided by the digital map database 135 and camera data provided by the camera 140, as explained in greater detail below.

The alert module 120 can generate alerts based on the rationalization value. For example, the alert module 120 may generate a visual and/or audible alert to alert the operator of the vehicle 20 of potential discrepancies. The alert can be displayed at human machine interface, such as a display screen, within the vehicle 20. Based on the alert, the operator may take action, such as operating the vehicle 20 or the like.

The vehicle control module 125 receives data from the vehicle state and path estimation module 110 to cause the vehicle 20 to traverse the determined path. For example, based on the vehicle path data determined by the vehicle state and path estimation module 110, the vehicle control module 125 can operate the vehicle 20 according to a determine desired vehicle speed and desired vehicle trajectory. For example, the vehicle control module 125 can control a steering, braking, acceleration, lateral, and longitudinal movements of the vehicle 20.

The localization module 130 receives map data from the digital map database 135 and localizes the vehicle 20 based on the map data and/or sensor data. In an example implementation, based on a GPS location of the vehicle 20, the localization module 130 determines a vehicle location relative to the map data. For example, the localization module 130 can determine a relative location of the vehicle 20 on a roadway, such as which lane the vehicle 20 is traversing.

The digital map database 135 includes data regarding an area proximate to the vehicle 20 including historically documented road geometry, lanes within the road, synthesized data such as vehicle to vehicle or infrastructure to vehicle data regarding road geometry, and other information that can be monitored and stored about a particular area upon which the vehicle 20 may travel. Road geometry data can include, but is not limited to, road curvature estimations, bank angle estimations, and/or grade angle estimations.

The fusion module 145 can receive camera data from the cameras 140 and apply suitable fusion techniques to determine lane-level offsets, lane-level curvature, lane-level bank angle, and/or lane-level grade angle data. For example, the fusion module 145 may use suitable object classification and/or detection techniques to determine the lane-level offsets, lane-level curvature, lane-level bank angle, and/or lane-level grade angle data based on camera images captured by the camera 140.

Figure 3:
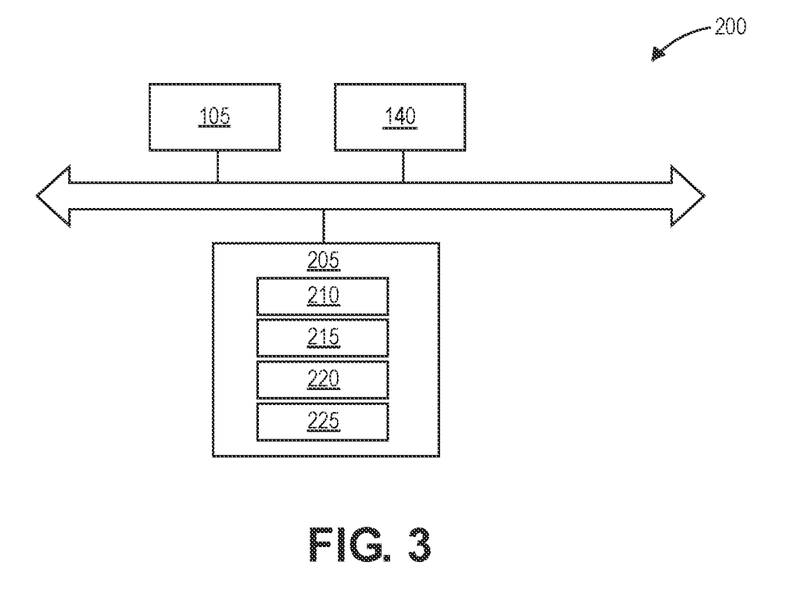
FIG. 3 depicts an example communication system.

FIG. 3 illustrates an example data communication system 200 within a vehicle being controlled. The data communication system 200 includes the sensors 110, the camera 140, and the computing device 205 communicatively connected via a vehicle data bus 240. The vehicle data bus 240 includes a communication network capable of transferring data quickly back and forth between various connected devices and modules. Data can be collected from each of the sensor devices 105, the cameras 140, and/or the digital map database 120. As described in greater detail herein, the computing device 205 can use the sensor data to determine whether discrepancies in map data obtained by the digital map database 120.

Figure 4:
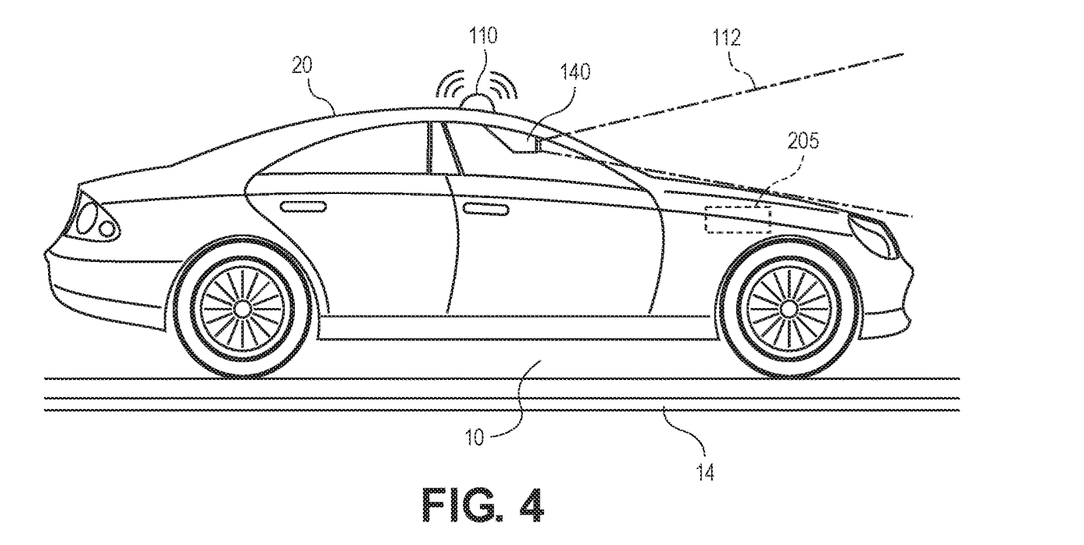
FIG. 4 depicts an example vehicle including one or more sensor devices, a camera, and a computing device.

FIG. 4 illustrates an example vehicle 20 that can be navigated using the control system 100. As shown, the vehicle 20 is traversing upon a road surface 10 including lane markings 14. The vehicle 20 can include the computing device 205, the sensor device(s) 105, and the camera 140. The camera 140 includes a field of view 112 and is positioned to capture images of the road surface 10 and other objects and obstacles near the vehicle 20. The sensor device(s) 105 can additionally provide data regarding objects near the vehicle 20. The computing device 205 receives data from the sensor device(s) 105 and/or the camera 140.

Figure 5:
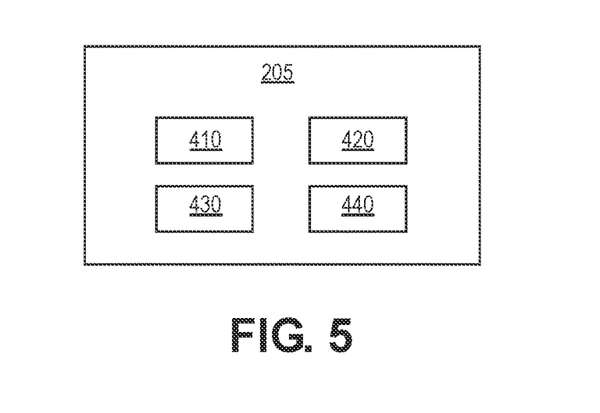
FIG. 5 depicts an example computing device.

FIG. 5 illustrates an example computing device 205. The computing device 205 includes a processor 410, a data input/output module 420, a communications module 430, and a memory storage device 440. It is noted that the computing device 205 may include other components and some of the components are not present in some implementations.

The processor 410 may include memory, e.g., read only memory (ROM) and random-access memory (RAM), storing processor-executable instructions and one or more processors that execute the processor-executable instructions. In implementations where the processor 410 includes two or more processors, the processors may operate in a parallel or distributed manner. The processor 410 may execute the operating system of the computing device 205. The processor 410 may include one or more modules executing programmed code or computerized processes or methods including executable steps. Illustrated modules may include a single physical device or functionality spanning multiple physical devices.

The data input/output module 420 is a device that is operable to take data gathered from sensors and devices throughout the vehicle and process the data into formats readily usable by processor 410. Data input/output module 420 is further operable to process output from processor 410 and enable use of that output by other devices or modules throughout the vehicle. For example, the data input/output module 420 may comprise a human-machine interface to display alerts to the vehicle's 20 operator.

The communications module 430 may include a communications/data connection with a bus device configured to transfer data to different components of the system and may include one or more wireless transceivers for performing wireless communication.

The memory storage device 440 is a device that stores data generated or received by the computing device 205. The memory storage device 440 may include, but is not limited to, a hard disc drive, an optical disc drive, and/or a flash memory drive.

The computing device 205 can determine whether a discrepancy exists between map data, sensor data, and/or camera data. In some implementations, if a discrepancy exists, the computing device 205 can generate an alert and/or modify a vehicle state. The computing device 205 includes the road geometry approximation module 150. The road geometry approximate module 150 transforms vehicle dynamic state data to corresponding roadway geometry data. The road geometry approximation module 150 can transform the vehicle dynamic state data to roadway geometry data according to Equations 1 through 12 assuming constant longitudinal velocity (same theory applies with variable velocity by incorporating nonzero $\overline{v}_x$):

$$\delta_k = \delta_{k-1} \qquad \text{Eq. 1}$$

$$\dot{v}_{y,k} = \left(-\frac{2C_f + 2C_r}{mv_{x,k}}\right)v_{y,k-1} - v_{x,k}\omega_{z,k-1} - \left(\frac{2C_f l_f - 2C_r l_r}{mv_{x,k}}\right)\omega_{z,k-1} + \left(\frac{2C_f}{m}\right)\delta_k \qquad \text{Eq. 2}$$

$$\dot{\omega}_{z,k} = \left(-\frac{2C_f l_f - 2C_r l_r}{I_z v_{x,k-1}}\right)v_{y,k-1} - \left(\frac{2C_f l_f^2 + 2C_r l_r^2}{I_z v_{x,k}}\right)\omega_{z,k-1} + \left(\frac{2C_f l_f}{I_z}\right)\delta_k \qquad \text{Eq. 3}$$

$$a_{y,k} = a_{y,k-1} \qquad \text{Eq. 4}$$

$$\psi_k = \psi_{k-1} + dt\omega_{z,k-1} \qquad \text{Eq. 5}$$

$$\dot{C}_{0,k} = [C_{0,k} - C_{0,k-1}] \cdot \frac{1}{dt} \qquad \text{Eq. 6}$$

-continued $$C_{1,k} = C_{1,k-1} + 2dt \cdot C_{2_k} \cdot (v_{x,k} - v_{y,k} \cdot \psi_k) - dt \cdot \dot{\psi}_k \qquad \text{Eq. 7}$$

$$\hat{v}_{y,k} = \dot{C}_{0,k} - C_{1,k}\omega_{z,k} \qquad \text{Eq. 8}$$

$$\hat{\dot{v}}_{y,k} = \alpha_1 \hat{v}_{y,k} + \alpha_2 [\hat{v}_{y,k} - \hat{v}_{y,k-1}] \cdot \frac{1}{dt} \qquad \text{Eq. 9}$$

$$\theta_{v,k} = \arcsin\frac{1}{g}\left(\hat{a}_{y_k} - \hat{\dot{v}}_{y,k} - \omega_{z,k} * v_{x,k}\right); \qquad \text{Eq. 10}$$

$$\rho_V = \frac{\omega_{z,k}}{v_{x,k}} \qquad \text{Eq. 11}$$

$$\phi_V = \arcsin\left(\frac{a_{x,k}}{g}\right), \qquad \text{Eq. 12}$$

where δ is a vehicle from road wheel angle, $v_y$ is vehicle lateral velocity, $v_x$ is longitudinal velocity, $\omega_z$, is yaw rate, $l_r$ is distance of CG to rear axle of the vehicle, $l_f$ ds the distance of CG to front axle of the vehicle, $C_1$ is relative heading of host vehicle to the lane marking, $C_0$ is lateral offset of host vehicle to the desired trajectory, $\rho_v$ is estimated vehicle curvature, $\theta_v$, road estimated bank angle, $\phi_v$ is estimated road grade angle, $\alpha_{y,k}$ is lateral acceleration, $\psi_k$ is estimated vehicle heading, $C_f$ is front tire cornering stiffness, $C_r$ is rear tire cornering stiffness, m is vehicle's mass, $I_z$ is vehicle's moment of inertia, $\alpha_1$, $\alpha_2 > 0$ are design parameter for weighted average ($\alpha_1+\alpha_2=1$).

The adaptive rationalizer module 115 calculates various error values as defined in Equations 13 through 15:

$$e_\rho = \rho_{map} - \rho_V, \qquad \text{Eq. 13}$$

$$e_\theta = \theta_{map} - \theta_V \qquad \text{Eq. 14}$$

$$e_\varnothing = \varnothing_{map} - \varnothing_V \qquad \text{Eq. 15}$$

where $e_\rho$ comprises a curvature estimation error, $e_\theta$ comprises a bank angle estimation error, $e_\varnothing$ represents a grade angle estimation error, $\rho_{map}$ comprises a map-based curvature estimation, $\theta_{map}$ comprises a map-based bank angle estimation, $\varnothing_{map}$ comprises a map-based grade angle estimation, $\rho_V$ comprises a vehicle curvature estimation, $\theta_V$ comprises a vehicle bank angle estimation, and $\varnothing_v$, comprises a vehicle grade angle estimation.

The adaptive rationalizer module 115 can then calculate a rationalization value that is indicative of a discrepancy between map-based roadway estimations and sensor-based roadway estimations. The adaptive rationalizer module 115 can calculate the rationalization value according to Equation 16:

$$R = E^T Q E \qquad \text{Eq. 16}$$

where $$E = \begin{bmatrix} e_\rho \\ e_\theta \\ e_\varnothing \end{bmatrix},$$

R is the rationalization value, $E^T$ is a transpose of E, and Q is adapted in real-time based on SC/UC tracking control error $Q = f(e_{trck}, \bar{e}_{trck})$ where $e_{trck}$ comprises lane centering error tracking and $\bar{e}_{trck}$ comprises a derivative of $e_{trck}$ to represent the rate of change of the $e_{trck}$.

The adaptive rationalizer module 115 can also calculate the rate of change of the rationalization value R. For example, the rationalizer module 115 can determine the rate of change by calculating the derivative of rationalization value R. The rate of change of the rationalization value R can be represented as $\bar{R}$.

The rationalization value R can represent an explicit quantification of an error, e.g., discrepancy, between map data, sensor data, and/or camera data. The adaptive rationalizer module 115 can combine localization and perception data over a receding horizon with previous vehicle dynamic measurements. A receding horizon can comprise predicted vehicle states based on received sensor data and/or camera data. For example, the computing device 205 can calculate a receding horizon based on the received sensor data and/or camera data. The computing device 205 can also construct a receding horizon that comprises stored sensor data and/or camera data. In other words, the receding horizon may comprise a time window of stored vehicle dynamic data that can be used to construct receding horizon predictions.

In various implementations, the computing device 205 can quantify an error between the map data, the sensor data, and/or the camera data over a predefined period of time, i.e., steady state, by using suitable models of the rationalization value R and its rate of change $\bar{R}$. In some instances, the computing device 205 uses the receding and/or the historical horizon data to generate a confidence interval. For example, the computing device 205 can apply suitable model-error algorithms to the rationalization value R and its rate of change $\bar{R}$ based on the receding and/or the historical horizon data.

The rationalization value R can be used to modify one or more vehicle 20 operations. In some instances, the computing device 205 may de-weight camera data received from the cameras 140 when the rationalization value R exceeds a predetermined rationalization threshold. In some instances, the alert module 120 generates an alert, e.g., via the data input/output module 420, when the rationalization value R exceeds the predetermined rationalization threshold. In some instances, the computing device 205 may cause the vehicle 20 to transition from a first vehicle operation state to a second vehicle operation state via the vehicle control module 125. For example, the computing device 205 may cause the vehicle 20 to transition from an autonomous state to a semi-autonomous or non-autonomous state, e.g., reduce control authority in uncertain environments as represented by the rationalization value R, such that the vehicle 20 operator has to at least partially operate the vehicle 20. The computing device 205 can also evaluate a localized lane likelihood based on the rationalization value with respect to identified lane line and correct for lane level localization. The computing device 205 can also adapt an autonomous or a semiautonomous feature availability or control based on an assessment of the rationalization error over the prediction horizon. The computing device 205 can also combine localization and perception data over a receding horizon with historical vehicle dynamics measurements to isolate a source of potential discrepancies for robust lane following controls.

In some instances, the computing device 205 may transmit a map database update trigger to indicate that the map data is requiring an update for a segment of the roadway when the rationalization value R exceeds the predetermined rationalization threshold. The map database update trigger may be transmitted to an entity that controls the map data provided to the map database 120. In some instances, the computing device 205 can determine that the vehicle 20 is traversing a construction zone. For example, the computing device 205 can compare the current rationalization value R to the historical horizon. If the rationalization value R deviates greater than a predetermined deviation amount from the historical horizon, the computing device 205 can determine that the vehicle 20 traversing a construction zone.

Figure 6:
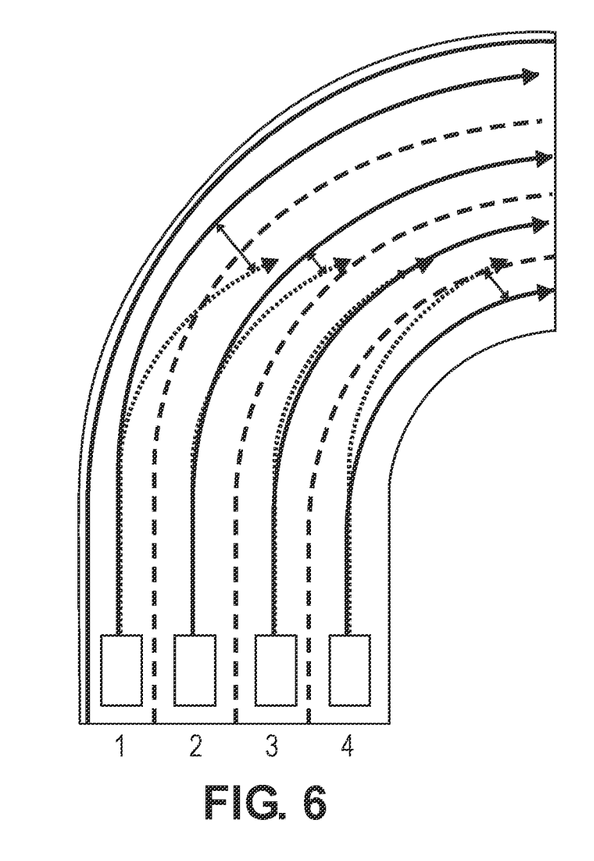
FIG. 6 depicts an example roadway segment including multiple lanes.

FIG. 6 illustrates an example environment 600 in which the computing device 205 can select lane 3 based on lane 3 having the lowest rationalization value R, i.e., the lowest rationalization value R with respect to lanes 1, 2, and 4. It is understood that the rationalization value R can comprise an additional input to vehicle localization algorithms.

Figure 7:
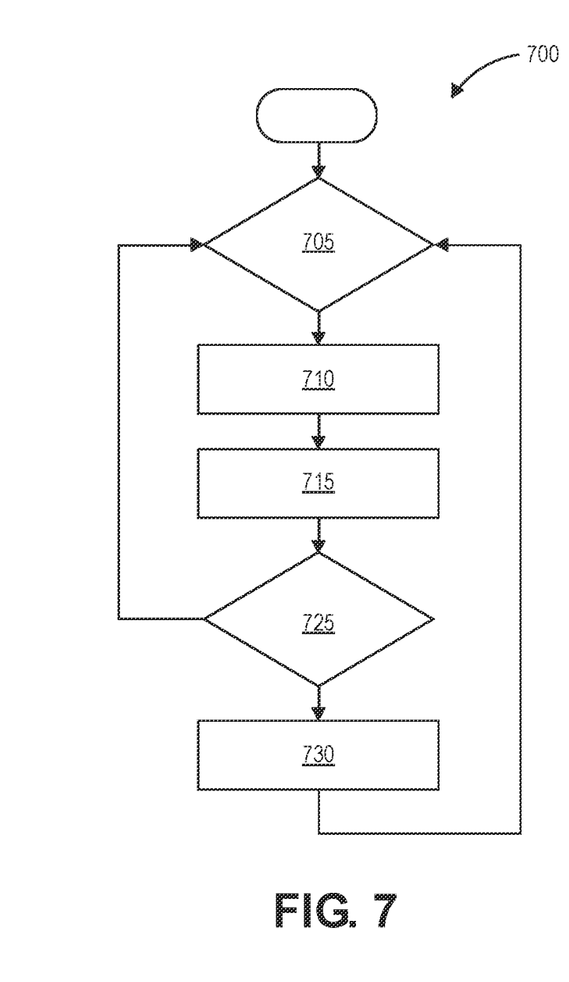
FIG. 7 is a flow diagram illustrating an example process for calculating the rationalization value.

FIG. 7 is a flowchart of an example process 700 for calculating the rationalization value R. Blocks of the process 700 can be executed by the computing device 205. The process 700 begins at block 705, in which the computing device determines whether sensor data and/or camera data has been received. If the computing device 205 determines that neither sensor data nor camera data has been received, the process 700 returns to block 705. Otherwise, at block 710, the computing device 205 transforms vehicle dynamic state data to corresponding roadway geometry data.

At block 715, the computing device 205 calculates the rationalization value R. At block 720, the computing device 205 calculates the rate of change of the rationalization value R by calculating the derivative of the rationalization value R. At block 725, the computing device 205 determines if $R > \varepsilon_R$ and $\dot{R} > \varepsilon_{\dot{R}}$, where $\varepsilon_R$ comprises the predetermined rationalization threshold and $\varepsilon_{\dot{R}}$ comprises a predetermined rationalization rate of change threshold.

If $R \leq \varepsilon_R$ or $\dot{R} \leq \varepsilon_{\dot{R}}$, the process 700 returns to block 705. Otherwise, the computing device 205 can determine one or more vehicle actions based on the rationalization value R at block 730. For example, the computing device 205 may disallow lane centering and/or lane changes while $R > \varepsilon_R$ and $\dot{R} > \varepsilon_{\dot{R}}$. Additionally or alternatively, the computing device 205 may flag a segment of the map data corresponding to the roadway segment for re-mapping. The computing device 205 may also apply a weight to the flag to indicative a potential severity of the rationalization value R. It is understood that the vehicle actions can comprise additional vehicle actions, such as those listed above. The process 700 then transitions to block 705.

While at least one example implementation has been presented in the foregoing detailed description, it should be appreciated that a vast number of variations exist. It should also be appreciated that the exemplary implementation or exemplary implementations are only examples, and are not intended to limit the scope, applicability, or configuration of the disclosure in any way. Rather, the foregoing detailed description will provide those skilled in the art with a convenient road map for implementing the exemplary implementation or exemplary implementations. It should be understood that various changes can be made in the function and arrangement of elements without departing from the scope of the disclosure as set forth in the appended claims and the legal equivalents thereof.

The detailed description is merely exemplary in nature and is not intended to limit the application and uses. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Implementations of the present disclosure may be described herein in terms of functional and/or logical block components and various processing steps. It should be appreciated that such block components may be realized by any number of hardware, software, and/or firmware components configured to perform the specified functions. For example, an implementation of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that implementations of the present disclosure may be practiced in conjunction with any number of systems, and that the systems described herein is merely example implementations of the present disclosure.

What is claimed is:

1. A system in a vehicle traveling on a roadway, the system comprising a computing device including a processor and a memory, the memory including instructions such that the processor is configured to:
    transform vehicle dynamics data, received from one or more sensors mounted on the vehicle, to corresponding roadway geometry data;
    calculate a rationalization value based on a difference between the roadway geometry data and map-based roadway geometry data, wherein the rationalization value is calculated according to:

$$e_\rho = \rho_{map} - \rho_V,$$

$$e_\theta = \theta_{map} - \theta_V,$$

$$e_\varnothing = \varnothing_{map} - \varnothing_V,$$

where $e_\rho$ comprises a curvature estimation error, $e_\theta$ comprises a bank angle estimation error, $e_\varnothing$ represents a grade angle estimation error, $\rho_{map}$ comprises a map-based curvature estimation, $\theta_{map}$ comprises a map-based bank angle estimation, $\varnothing_{map}$ comprises a map-based grade angle estimation, $\rho_V$ comprises a vehicle curvature estimation, $\theta_V$ comprises a vehicle bank angle estimation, and $\varnothing_V$ comprises a vehicle grade angle estimation;
    determine whether to modify a vehicle state based on the rationalization value; and
    command a change in the vehicle state from an autonomous state to at least one of a semi-autonomous state or a non-autonomous state based on the rationalization value.

2. The system as recited in claim 1, wherein the processor is further configured to calculate a rate of change of the rationalization value.

3. The system as recited in claim 2, wherein the processor is further configured to determine whether to modify the vehicle state based on the rationalization value and the rate of change of the rationalization value.

4. The system as recited in claim 1, wherein the processor is further configured to flag map data corresponding to a roadway segment and correct map data base in that segment, wherein the vehicle dynamics data corresponds to the roadway segment.

5. The system as recited in claim 1, wherein the processor is further configured to calculate the rationalization value according to $R = E^T Q E$, where $$E = \begin{bmatrix} e_\rho \\ e_\theta \\ e_\phi \end{bmatrix},$$

R is the rationalization value, $E^T$ is a transpose of E, and Q is adapted based on lane centering error tracking.

6. The system as recited in claim 1, wherein the processor is further configured to at least one of generate an alert based on the rationalization value or reduce control authority in uncertain environments.

7. The system as recited in claim 1, wherein the processor is further configured to evaluate a localized lane likelihood based on the rationalization value with respect to identified lane line and correct for lane level localization.

8. The system as recited in claim 1, wherein the processor is further configured to adapt at least one of an autonomous or a semiautonomous feature availability or control based on an assessment of the rationalization error over a prediction horizon.

9. The system as recited in claim 1, wherein the processor is further configured to combine localization and perception data over a receding horizon with historical vehicle dynamics measurements to isolate a source of potential discrepancies for robust lane following controls.

10. A vehicle including a system, the system comprising a controller including a processor and a memory, the memory including instructions such that the processor is configured to:
   transform vehicle dynamics data, received from one or more sensors mounted on the vehicle, to corresponding roadway geometry data;
   calculate a rationalization value based on a difference between the roadway geometry data and map-based roadway geometry data, wherein the rationalization value is calculated according to:

$e_\rho = \rho_{map} - \rho_V,$ $e_\theta = \theta_{map} - \theta_V,$ $e_\phi = \phi_{map} - \phi_V,$ where $e_\rho$ comprises a curvature estimation error, $e_\theta$ comprises a bank angle estimation error, $e_\phi$ represents a grade angle estimation error, $\rho_{map}$ comprises a map-based curvature estimation, $\theta_{map}$ comprises a map-based bank angle estimation, $\phi_{map}$ comprises a map-based grade angle estimation, $\rho_V$ comprises a vehicle curvature estimation, $\theta_V$ comprises a vehicle bank angle estimation, and $\phi_V$ comprises a vehicle grade angle estimation;
   determine whether to modify a vehicle state based on the rationalization value; and command a change in the vehicle state from an autonomous state to at least one of a semi-autonomous state or a non-autonomous state based on the rationalization value.

11. The vehicle as recited in claim 10, wherein the processor is further configured to calculate a rate of change of the rationalization value.

12. The vehicle as recited in claim 11, wherein the processor is further configured to determine whether to modify the vehicle state based on the rationalization value and the rate of change of the rationalization value.

13. The vehicle as recited in claim 10, wherein the processor is further configured to flag map data corresponding to a roadway segment, wherein the vehicle dynamics data corresponds to the roadway segment.

14. The vehicle as recited in claim 10, wherein the processor is further configured to calculate the rationalization value according to $R = E^T Q E$, where $$E = \begin{bmatrix} e_\rho \\ e_\theta \\ e_\phi \end{bmatrix},$$

R is the rationalization value, $E^T$ is a transpose of E, and Q is adapted based on lane centering error tracking.

15. The vehicle as recited in claim 10, wherein the processor is further configured to generate an alert based on the rationalization value.

16. The vehicle as recited in claim 10, wherein the processor is further configured to evaluate a localized lane likelihood based on the rationalization value with respect to identified lane line and correct for lane level localization.

17. A vehicle comprising:
   one or more sensors mounted on the vehicle;
   a vehicle control module configured to control a steering, a braking, an acceleration, a lateral movement, and longitudinal movement of the vehicle; and
   a controller including a processor and a memory, the memory including instructions such that the processor is configured to:
   transform vehicle dynamics data, received from the one or more sensors, to corresponding roadway geometry data;
   calculate a rationalization value based on a difference between the roadway geometry data and map-based roadway geometry data, wherein the rationalization value is calculated according to:

$e_\rho = \rho_{map} - \rho_V,$ $e_\theta = \theta_{map} - \theta_V,$ $e_\phi = \phi_{map} - \phi_V,$ where $e_\rho$ comprises a curvature estimation error, $e_\theta$ comprises a bank angle estimation error, $e_\phi$ represents a grade angle estimation error, $\rho_{map}$ comprises a map-based curvature estimation, $\theta_{map}$ comprises a map-based bank angle estimation, $\phi_{map}$ comprises a map-based grade angle estimation, $\rho_V$ comprises a vehicle curvature estimation, $\theta_V$ comprises a vehicle bank angle estimation, and $\phi_V$ comprises a vehicle grade angle estimation;
   determine whether to modify a vehicle state based on the rationalization value; and
   command the vehicle control module to change from an autonomous state to at least one of a semi-autonomous state or a non-autonomous state based on the rationalization value.

18. The vehicle as recited in claim 17, wherein the processor is further configured to calculate a rate of change of the rationalization value.

19. The vehicle as recited in claim 17, wherein the processor is further configured to determine whether to modify the vehicle state based on the rationalization value and the rate of change of the rationalization value.

20. The vehicle as recited in claim 17, wherein the processor is further configured to flag map data corresponding to a roadway segment, wherein the vehicle dynamics data corresponds to the roadway segment.

* * * * *